(12) United States Patent
Buhot et al.

(10) Patent No.: US 10,275,007 B2
(45) Date of Patent: Apr. 30, 2019

(54) PERFORMANCE MANAGEMENT FOR A MULTIPLE-CPU PLATFORM

(71) Applicant: Intel Corporation, Santa Clara, CA (US)

(72) Inventors: Thomas Buhot, Toulouse (FR); Stephane Gasparini, Tournfeuille (FR)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 14/498,500

(22) Filed: Sep. 26, 2014

(65) Prior Publication Data

US 2016/0091949 A1    Mar. 31, 2016

(51) Int. Cl.
| | |
|---|---|
| G06F 1/32 | (2006.01) |
| G06F 1/3206 | (2019.01) |
| G06F 1/3234 | (2019.01) |
| G06F 1/329 | (2019.01) |
| G06F 1/324 | (2019.01) |
| G06F 11/34 | (2006.01) |
| G06F 9/48 | (2006.01) |
| G06F 11/30 | (2006.01) |

(52) U.S. Cl.
CPC ............ *G06F 1/3206* (2013.01); *G06F 1/324* (2013.01); *G06F 1/329* (2013.01); *G06F 1/3234* (2013.01); *G06F 9/4893* (2013.01); *G06F 11/3024* (2013.01); *G06F 11/348* (2013.01); *G06F 11/3423* (2013.01); *G06F 2201/88* (2013.01); *Y02D 10/126* (2018.01); *Y02D 10/24* (2018.01); *Y02D 10/34* (2018.01)

(58) Field of Classification Search
CPC ..... G06F 1/32; G06F 1/26; G06F 1/28; G06F 1/00

USPC ....... 713/300, 310, 320, 321, 322, 323, 324, 713/340, 375
See application file for complete search history.

(56) References Cited

U.S. PATENT DOCUMENTS

| | | | | |
|---|---|---|---|---|
| 5,161,116 | A * | 11/1992 | Schneider | G06F 11/3414 702/186 |
| 7,380,115 | B2 * | 5/2008 | Maine | G06F 13/28 710/22 |
| 2002/0194509 | A1 * | 12/2002 | Plante | G06F 1/206 713/300 |
| 2009/0044044 | A1 * | 2/2009 | Harter | G06F 11/1407 714/6.23 |
| 2013/0007494 | A1 * | 1/2013 | Branover | G06F 1/3203 713/323 |
| 2013/0232331 | A1 * | 9/2013 | Farhan | G06F 11/3006 713/100 |

(Continued)

OTHER PUBLICATIONS

Brodowski, "CPU frequency and voltage scaling code in the Linux(TM) kernel," Linux CPUFreq CPUFreq Governors—information for users and developers, Dec. 29, 2014, 5 pages.

(Continued)

*Primary Examiner* — Jaweed A Abbaszadeh
*Assistant Examiner* — Keshab R Pandey
(74) *Attorney, Agent, or Firm* — Barnes & Thornburg LLP

(57) ABSTRACT

A multiple-CPU (e.g., multi-core) computing device includes P-state management technologies that allow the computing device to update P-state data of all of the individual CPUs using a single periodic task running on one of the CPUs.

25 Claims, 4 Drawing Sheets

(56) References Cited

U.S. PATENT DOCUMENTS

| | | | | |
|---|---|---|---|---|
| 2014/0317348 A1* | 10/2014 | Watanabe | ............ | G06F 3/0613 |
| | | | | 711/114 |
| 2014/0380326 A1* | 12/2014 | Kurihara | ............... | G06F 9/4881 |
| | | | | 718/102 |
| 2015/0346798 A1* | 12/2015 | Dongara | ............... | G06F 1/3206 |
| | | | | 713/320 |

OTHER PUBLICATIONS

Chen, "Power Management Features in Intel Processors," UPitt CS 3150, Guest Lecture, Feb. 24, 2010, 43 pages.

\* cited by examiner

PERFORMANCE MANAGEMENT FOR A MULTIPLE-CPU PLATFORM

BACKGROUND

A P-state (or "performance state") of a central processing unit (CPU) of a computing device is an operational state of the CPU represented by the CPU's operating frequency and voltage during a period of normal execution (e.g., while the CPU is executing instructions). Dynamic frequency and voltage scaling techniques can be used to vary the CPU frequency and/or voltage to achieve particular efficiency or performance objectives. On some computing platforms, a frequency driver or "governor task" of the central processing unit (CPU) manages the CPU frequency. On multiple-CPU (e.g., multi-core) platforms, separate governor tasks manage the CPU frequency for each individual CPU, and the governor tasks are not synchronized across the CPUs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
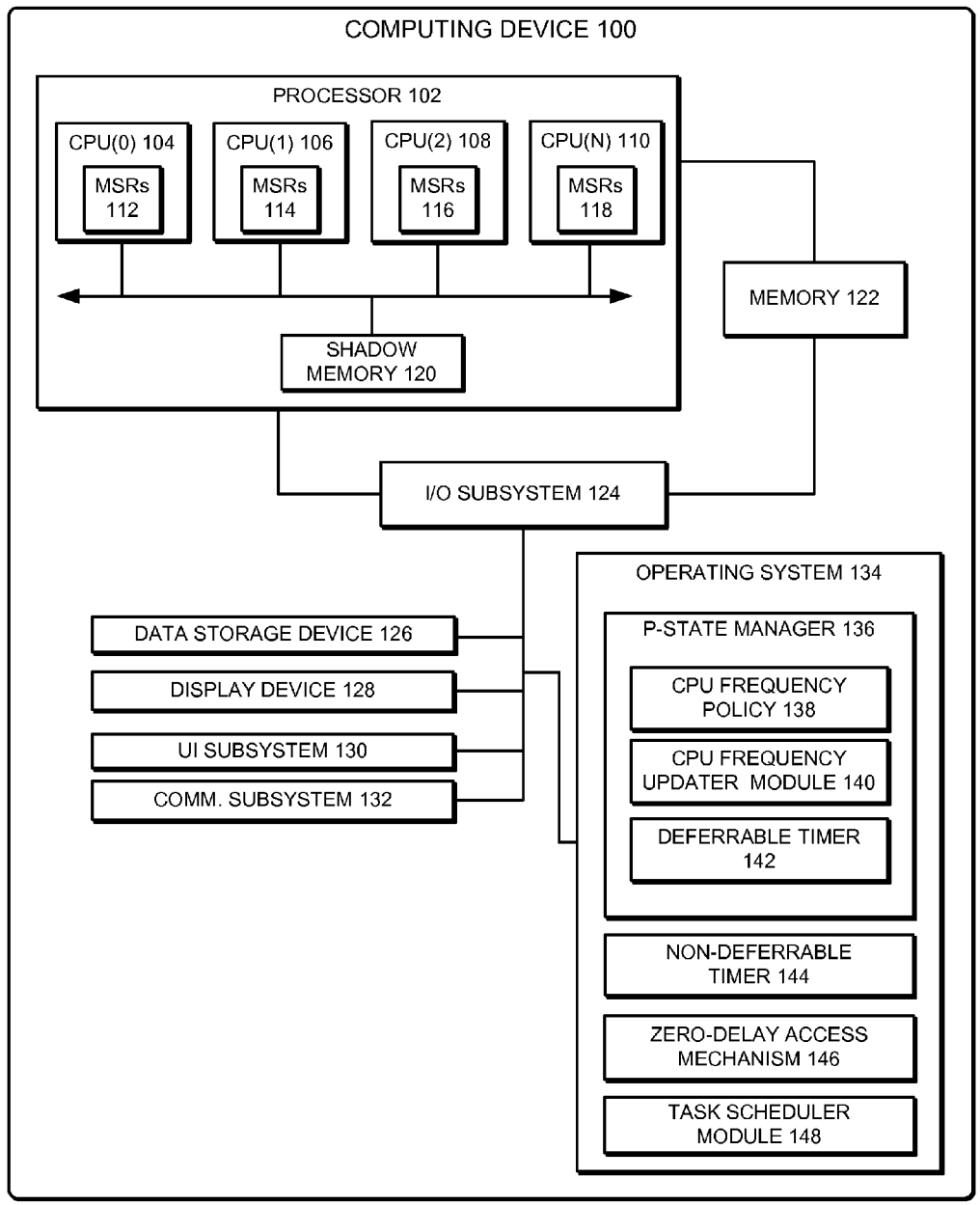
FIG. 1 is a simplified block diagram of at least one embodiment of a computing device configured with multiple-CPU P-state management technology as disclosed herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a multiple-CPU (e.g., multi-core) computing device 100 includes a number "N" of CPUs 104, 106, 108, 110 (where N is a positive integer greater than or equal to two). Power management technologies of the computing device 100 include a P-state manager 136. As described in more detail below, the P-state manager 136 manages P-state data for all of the CPUs 104, 106, 108, 110 while running as a periodic task on one of the CPUs 104, 106, 108, 110. In response to the expiration of a deferrable timer 142, the P-state manager 136 accesses CPU performance data for all of the CPUs 104, 106, 108, 110 using a zero-delay access mechanism 146, evaluates the CPU performance data in accordance with a CPU frequency policy 138, and updates the P-states of the CPUs 104, 106, 108, 110 as needed. In this way, the power management technologies of the computing device 100 avoid the need for separate P-state management processes that run on each individual CPU 104, 106, 108, 110. By reducing the number of interrupts, context switches, and tasks to be scheduled, the disclosed P-state management technologies can, among other things, reduce power consumption and increase the performance of the computing device 100.

The computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the illustrative computing device 100 includes at least one processor 102, which includes the N CPUs (or "cores") 104, 106, 108, 110. While four CPUs are illustrated in FIG. 1, it should be understood that the processor 102 may include any number of multiple CPUs (e.g., two or more CPUs), in other embodiments. Each CPU 104, 106, 108, 110 includes a number of machine specific registers (MSRs). The MSRs 112, 114, 116, 118 of each CPU 104, 106, 108, 110 are used by the P-state manager 136 and other system software to implement various performance management functions of the computing device 100. Each of the MSRs 112, 114, 116, 118 stores performance monitoring data such as performance counters, P-state data, CPU frequency, and CPU voltage data that is generated periodically by its respective CPU 104, 106, 108, 110. In some embodiments, the MSRs 112, 114, 116, 118 each include an APERF register (which holds actual CPU frequency counts), an MPERF register (which holds maximum frequency counts), a PERF_CTL register (which holds the P-state data), and a PERF_STATUS register (which outputs the current CPU frequency and operating voltage). The processor 102 also includes a shadow memory 120 (e.g., a shadow register or shared memory segment), which is communicatively coupled to the CPUs 104, 106, 108, 110 (e.g., by a bus), and is used by the zero-delay access mechanism 146 as described in more detail below.

The computing device also includes memory 122, an input/output subsystem 124, a data storage device 126, a display device 128, a user interface (UI) subsystem 130, a communication subsystem 132, and an operating system 134 (which, illustratively, includes the P-state manager 136, a non-deferrable timer 144, the zero-delay access mechanism 146, and a task scheduler module 148, as described below). The computing device 100 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor or other multiple-CPU processor or processing/controlling circuit. The memory 122 of the computing device 100 may be embodied as any type of volatile or non-volatile memory or data storage capable of performing the functions described herein. In operation, the memory 122 may store various data and software used during operation of the computing device 100, such as operating systems, applications, programs, libraries, and drivers.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth®, Wi-Fi®, WiMAX, 3G/LTE, NFC (Near Field Communication), etc.) to effect such communication. The communication subsystem 132 may be embodied as a network adapter, including a wireless network adapter.

The illustrative computing device 100 also includes a number of computer program components, such as the operating system 134. Among other things, the operating system 134 facilitates the communication between computer applications (e.g., user space applications and system space applications, any of which may be embodied as software, firmware, hardware, or a combination of software and hardware), and the hardware components of the computing device 100. The operating system 134 may be embodied as any operating system capable of performing the functions described herein, such as a version of WINDOWS by Microsoft Corporation, ANDROID by Google, Inc., OS X by Apple, Inc., iOS by Apple, Inc., and/or others.

The illustrative operating system 134 includes a number of computer program components, such as the P-state manager 136 (which includes the CPU frequency policy 138, a CPU frequency updater module 140, and the deferrable timer 142), the non-deferrable timer 144, the zero-delay access mechanism 146, and the task scheduler module 148. Each of the components of the operating system 134 may be embodied as software, firmware, hardware, or a combination of software and hardware. For example, the components of the operating system 134 may be embodied in the operating system kernel.

The illustrative P-state manager 136 includes the CPU frequency policy 138, the CPU frequency updater module 140, and the deferrable timer 142; however, any of the components of the P-state manager 136 may be implemented as separate components that communicate with the P-state manager 136 or with each other. The P-state manager 136 may be implemented as, for example a CPU frequency driver (e.g., as a "cpufreq governor" in the ANDROID operating system). In some embodiments (e.g., software embodiments), the P-state manager 136 is implemented as a single periodic task that runs on one of the CPUs 104, 106, 108, 110 but manages the P-states of all of the CPUs 104, 106, 108, 110 from the one periodic task running on the one CPU. The CPU that runs the P-state manager 136 may be referred to herein as the "main" CPU. In the illustrative embodiments, the CPU(0) 104 operates as the main CPU, but any of the other CPUs 106, 108, 110 may be designated as the main CPU, in other embodiments. In still other embodiments (e.g., firmware or hardware embodiments), the P-state manager 136 operates similarly (but is not executed on the CPUs 104, 106, 108, 110). The CPU frequency policy 138 is embodied as a mechanism of the operating system 134 (e.g., computer instructions, data, and/or data structures) that defines one or more criteria which the computing device 100 uses to select a target frequency for a particular CPU 104, 106, 108, 110, based on current operating conditions (e.g., the current CPU load) of the CPU 104, 106, 108, 110. For example, the CPU frequency policy 138 may define a range (e.g., one or more) of acceptable CPU frequencies from which a target frequency may be selected. Other examples of CPU frequency policy criteria include or relate to timings for switching from one frequency to another (e.g., an amount of time or a number of samplings before switching), a hysteresis mechanism, a policy to jump quickly to a higher frequency (or the highest frequency) if the CPU load exceeds a given threshold while the CPU frequency is low, and/or others.

In some embodiments, the computing device may evaluate the operating conditions of one or more of the other CPUs 104, 106, 108, 110 in determining the target frequency for a specific CPU. An example of a policy that may be implemented using suitable computer instructions (e.g., Java code) as the CPU frequency policy 138 is: "if the CPU load for this CPU has been greater than 80% for the last two timer interrupts, then increase this CPU's frequency to the maximum frequency."

The CPU frequency policy 138 may be defined or selected to achieve a particular objective, e.g., high performance or high efficiency, for the particular CPU, a group of CPUs, or for the processor 102 as a whole. For example, the CPU frequency policy 138 may set a CPU's frequency to the maximum frequency if the objective is performance, or set the CPU's frequency to the minimum frequency if the objective is efficiency (e.g., power conservation). In some cases, the CPU frequency policy 138 may allow the user, or a user space program running with appropriate privileges, to set the frequency to a specific value, or the CPU frequency policy 138 may set the frequency to a specific value depending on the current CPU usage level (as in the above example). In the illustrative embodiments, the CPU frequency policy 138 is the same for all of the CPUs 104, 106, 108, 110. In other embodiments, however, one or more of the CPUs 104, 106, 108, 110 may have different CPU frequency policies.

The CPU frequency updater module 140 is embodied as a mechanism of the operating system 134 (e.g., computer instructions, data, and/or data structures) that, when executed by the processor 102, causes the computing device 100 to periodically (e.g., in response to the expiration of a deferrable timer 142), evaluate and update P-state data for each of the CPUs 104, 106, 108, 110. In the illustrative embodiments, the CPU frequency updater module 140 manages a CPU's P-state by periodically updating the CPU frequency. In other embodiments, the CPU frequency updater module 140 may update the CPU voltage or update both the CPU frequency and the CPU voltage, in order to manage the CPU's P-state in accordance with the objective of the applicable performance management policy. For each of the CPUs 104, 106, 108, 110, the CPU frequency updater module 140 reads the CPU performance monitoring data (e.g., CPU performance counters, P-state frequency and voltage data) that is periodically generated by each of the CPUs 104, 106, 108, 110. The CPU frequency updater module 140 computes the current CPU load (based on, e.g., data read from the performance counter registers of the CPU). The CPU frequency updater module 140 computes a P-state target value (e.g., a target CPU frequency) based on the current CPU load, by executing a P-state decision algorithm. An illustrative example of a P-state decision algorithm is as follows: (i) if the CPU load measured during the previous period exceed a given threshold, e.g., 90%, switch to the next performance P-state; (ii) if the CPU load measured during the previous period exceeds a second given threshold, e.g., 95%, then switch to the maximum performance P-state and maintain the maximum performance P-state for at least 200 milliseconds (ms) before considering going to a lower performance P-state; (iii) if the CPU load measured during the previous period is below a given threshold, e.g., 50%, then immediately switch to a lower P-state; (iv) if the CPU load measured during the previous period is below a second given threshold, e.g., 10%, switch to the minimum P-state.

The CPU frequency updater module 140 compares the P-state target value to the range of P-state values (e.g., the CPU frequency range) specified in the CPU frequency policy 138. The CPU frequency updater module 140 determines a new P-state value by, for example, selecting, from the range of values specified in the CPU frequency policy 138, a CPU frequency value that is closest to the computed P-state target value). The CPU frequency updater module 140 applies the new P-state value (e.g., the new CPU frequency value) to the appropriate CPU 104, 106, 108, 110. As described further below, the CPU frequency updater module 140 executes a zero-delay access mechanism 146 of the operating system 134 in order to read the various CPU performance monitoring data.

The deferrable timer 142 is embodied as a mechanism (e.g., computer instructions, data, and/or data structures) of the operating system 134 that causes an interrupt to occur upon expiration of a time interval defined by the amount of time counted by the deferrable timer 142 before the deferrable timer 142 expires; however, the deferrable timer 142 only raises an interrupt if the processor 102 (or more specifically, the "main" CPU that is running the P-state manager 136) is in an active state (e.g., executing instructions) when the deferrable timer 142 expires. For example, if the main CPU is in a sleep state, the deferrable timer 142 will not wake up the main CPU with an interrupt until after the main CPU has already been awakened by some other mechanism, such as the non-deferrable timer 144. The non-deferrable timer 144 is embodied as a mechanism of the operating system 134 that raises an interrupt on expiration of the non-deferrable timer 144, even if the main CPU is not in an active state when the non-deferrable timer 144 expires. In contrast to prior solutions, the P-state manager 136 can use a single deferrable timer 142 to manage the P-states of all of the CPUs 104, 106, 108, 110, rather than a separate deferrable timer for each CPU.

The zero-delay access mechanism 146 is embodied as a mechanism (e.g., computer instructions, data, and/or data structures) of the operating system 134 that enables the P-state manager 136 to read the contents of all of the MSRs 112, 114, 116, 118 without using any interrupts and/or without using any inter-processor communications. The zero-delay access mechanism 146 maps the contents of the MSRs 112, 114, 116, 118 to the address space of the main CPU, using the shadow memory 120, as shown in FIG. 2, described below.

The task scheduler module 148 is embodied as a mechanism (e.g., computer instructions, data, and/or data structures) of the operating system 134 that schedules a task for execution by the processor (e.g., one of the CPUs 104, 106, 108, 110) after an interrupt. For example, expiration of the deferrable timer 142 causes an interrupt followed by execution of the task scheduler module 148 to schedule the CPU frequency updater module 140 to be executed by the main CPU.

Figure 2:
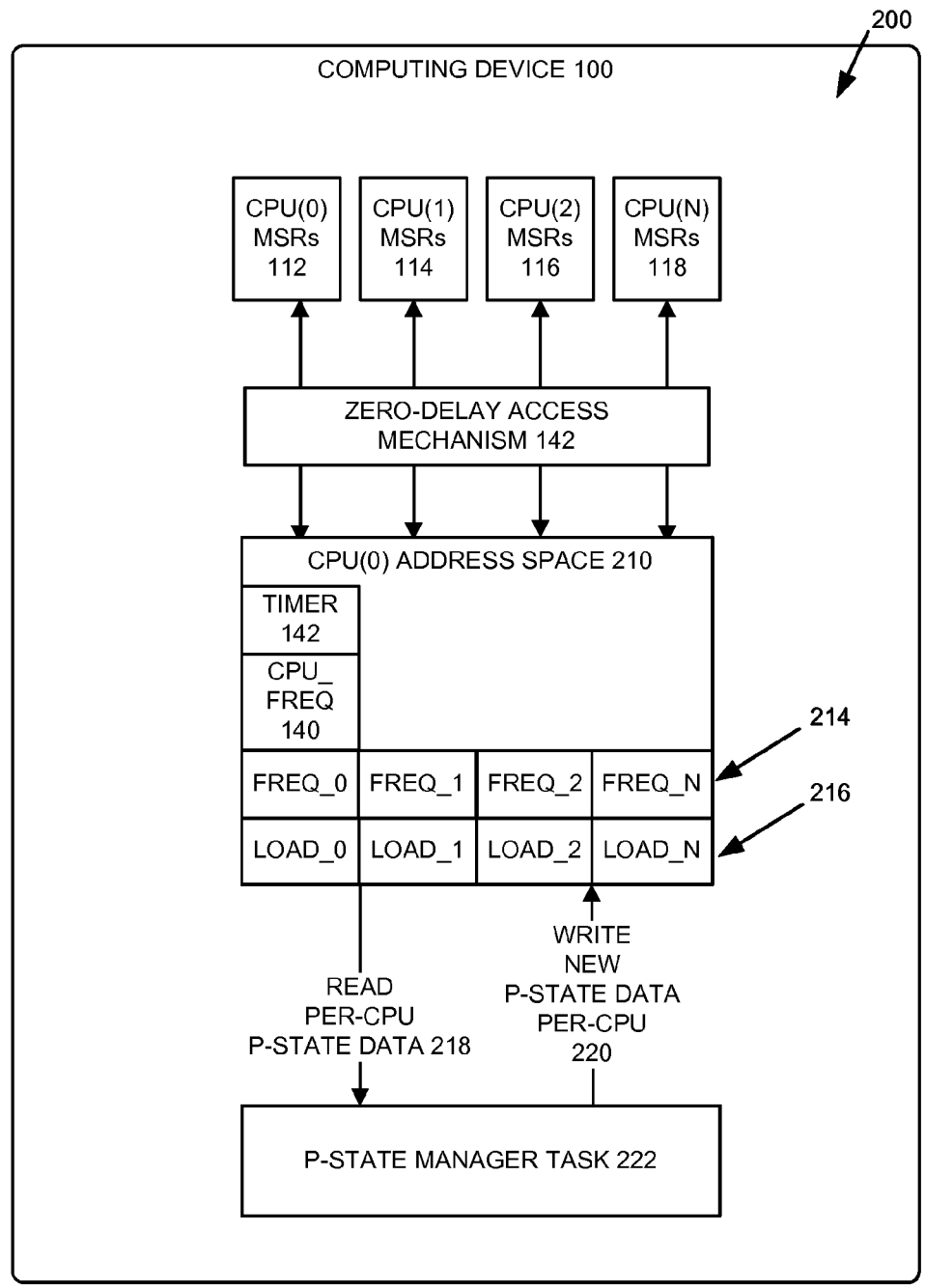
FIG. 2 is a simplified environment diagram of the computing device of FIG. 1, including use of a zero-delay access mechanism by the multiple-CPU P-state management technology.

Referring now to FIG. 2, in some embodiments, the computing device 100 establishes an environment 200 during operation (e.g., native and/or virtual runtime or "execution" environments). The various modules depicted in the environment 200 may be embodied as hardware, firmware, software, or a combination thereof. In the environment 200, the zero-delay access mechanism 146 maps the data values stored in the MSRs 112, 114, 116, 118 to a main CPU (e.g., CPU(0) 104) address space 210. As a result, the address space 210 contains the current performance monitoring data 214, 216 (e.g., CPU frequency, CPU load, P-states, and/or other information) for each of the CPUs 104, 106, 108, 110, as of the last time interval (established by expiration of a deferrable timer). Additionally, the main CPU has read and write access to portions of the MSRs 112, 114, 116, 118 of the other CPUs containing the performance monitoring data 214, 216 (e.g., read access to the data used to compute the CPU loads, and read and write access to the P-state data). The performance monitoring data 214, 216 is copied by the zero-delay access mechanism 146 to separate locations within the shadow memory 120 for each CPU 104, 106, 108, 110. Additionally, the main CPU address space 210 includes the deferrable timer 142 and the CPU frequency updater module 140.

When the deferrable timer 142 expires, a P-state manager periodic task 222 (e.g., an instance of the P-state manager 136) is initiated by an interrupt and begins running on the main CPU. The P-state manager periodic task 222 reads (218) performance monitoring data (e.g., P-state data) for each CPU 104, 106, 108, 110 from the CPU(0) address space 210, and evaluates the performance monitoring data (e.g., P-state data) for each of the CPUs 104, 106, 108, 110 vis a vis the applicable CPU frequency policy 138. If the evaluation of the performance monitoring data for a particular CPU indicates that the P-state needs to be updated for that CPU, the P-state manager periodic task 222 writes (220) the new P-state data (e.g., CPU frequency data) to the address(es) in the main CPU address space 210 that corresponds to the address(es) for the P-state data in that CPU's MSRs. In evaluating and updating the P-states of the different CPUs 104, 106, 108, 110, the P-state manager periodic task 222 can synchronize the CPU frequencies of different CPUs. Further, the P-state manager periodic task 222 can selectively update the CPU frequencies of the various CPUs 104, 106, 108, 110. For example, in a particular time interval, the P-state manager periodic task 222 may update the CPU frequencies of only the CPUs in a subset of the total number of CPUs 104, 106, 108, 110 without changing the frequencies of the other CPUs. In other words, in any given frequency update operation (220), the CPU frequencies of any of the CPUs 104, 106, 108, 110 may be updated (while others are not updated), and the frequency updates of some of the CPUs 104, 106, 108, 110 may be synchronized so that some of the CPUs 104, 106, 108, 110 operate at the same frequency at the same time (and other CPUs 104, 106, 108, 110 may operate at different frequencies at the same time).

Figure 3:
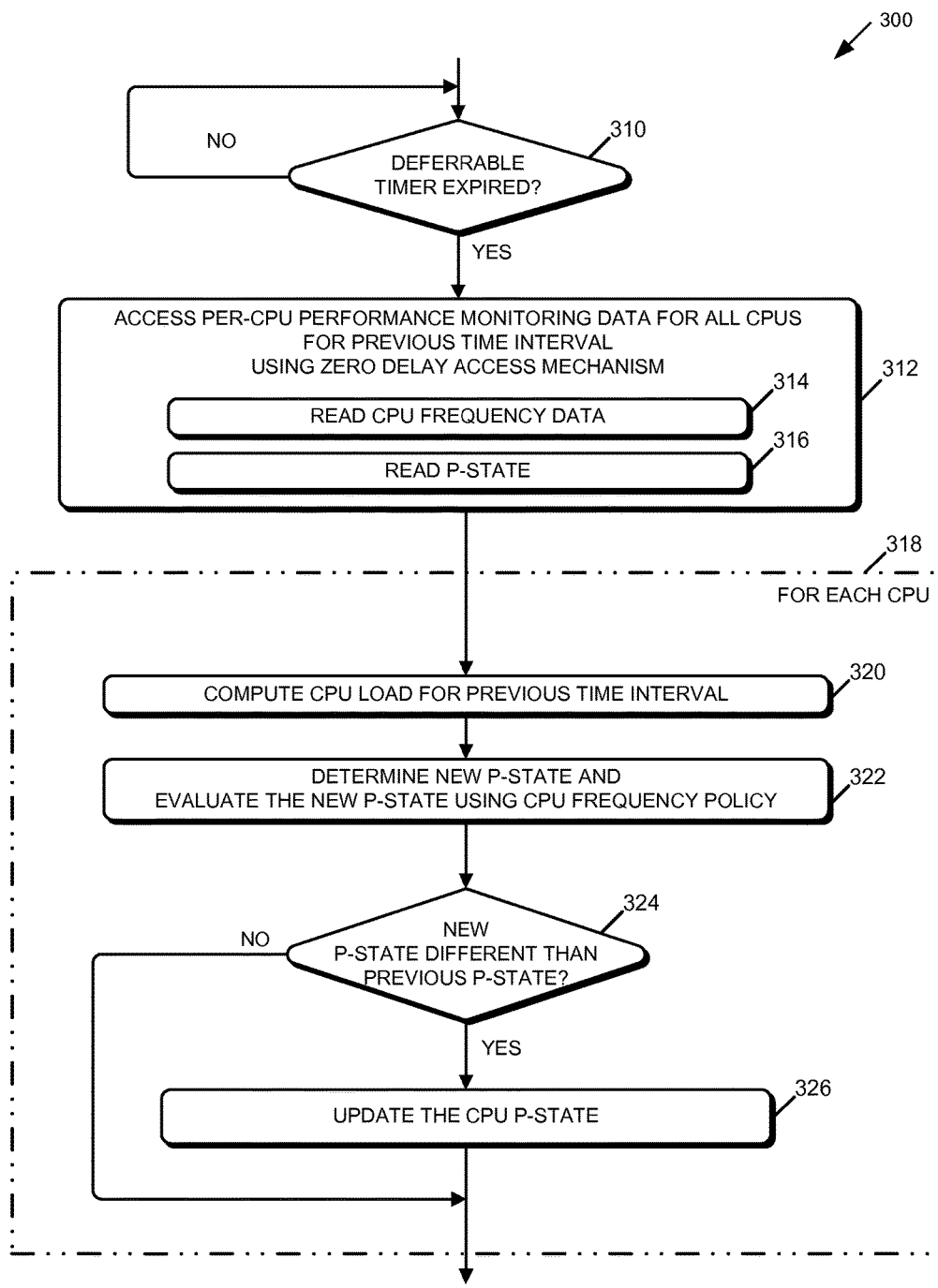
FIG. 3 is a simplified flow diagram of at least one embodiment of a method for managing the P-states of multiple CPUs as disclosed herein, which may be executed by the computing device of FIG. 1.

Referring now to FIG. 3, an example of a method 300 is shown. Portions of the method 300 may be executed by hardware, firmware, and/or software of the computing device 100 (e.g., by the operating system 134). At block 310, if a deferrable timer (e.g., the deferrable timer 142) has expired, the computing device 100 raises an interrupt, which causes the computing device 100 (e.g., the task scheduler module 148) to schedule a P-state management task (e.g., the P-state management periodic task 222) for execution by one of the CPUs 104, 106, 108, 110 that is operating as the "main" CPU. If the main CPU is not in an active state (e.g., the main CPU is in a sleeping state) when the deferrable timer expires, the deferrable timer does not wake up the main CPU to schedule the P-state management task, but rather is deferred until the main CPU subsequently wakes up through some other mechanism (e.g., the expiration of a non-deferrable timer). If the P-state management task is scheduled on the main CPU, the computing device 100 executes the tasks described in blocks 312 through 326, discussed below, as part of the P-state management task. If the P-state management task is not scheduled, the computing device 100 remains in block 310 until the P-state management task is scheduled.

During normal operation, each of the CPUs 104, 106, 108, 110 periodically writes its own performance monitoring data to its respective MSRs 112, 114, 116, 118 using, e.g., preprocessor macros. The performance monitoring data of each of the CPUs 104, 106, 108, 110 is mapped to the main CPU's address space (using, e.g., the shadow memory 120) as shown, for example, in FIG. 2. In block 312, the P-state management task running on the main CPU accesses the performance monitoring data for the previous time interval (e.g., data written since the previous deferrable timer expiration), for all of the CPUs 104, 106, 108, 110. To do this, the illustrative P-state management task issues a read request to the shadow memory 120, using a mechanism that does not issue any interrupts or inter-processor communications (e.g., the zero-delay access mechanism 146). The P-state management task reads, for each of the CPUs 104, 106, 108, 110, the CPU-specific frequency data (e.g., number of counts at actual frequency, number of counts at maximum frequency, etc., stored in the APERF and MPERF registers, in some architectures) in block 314. The P-state management task reads the CPU-specific P-state data (e.g., frequency and voltage operating points output to the PERF_CTL register, in some architectures), in block 316. These read operations by the P-state management task can be performed concurrently, e.g., to obtain all of the performance monitoring data for all of the CPUs 104, 106, 108, 110 at the same time.

With the performance monitoring data obtained for all of the CPUs 104, 106, 108, 110 in blocks 312, 314, 316, the P-state management task performs the activities of block 318, which are described in blocks 320, 322, 324, 326, for each of the CPUs 104, 106, 108, 110. The illustrative P-state management task performs the per-CPU activities of block 318 concurrently, e.g., to compute the CPU loads of all of the CPUs at the same time (block 320), and then updates the CPU frequencies of some or all of the CPUs 104, 106, 108, 110 as needed, in accordance with the applicable performance management policy (e.g., the CPU frequency policy 138), in block 326.

In block 320, the P-state management task computes the CPU load data value for a CPU 104, 106, 108, 110, for the previous time interval, based on the CPU frequency data (e.g., the APERF and MPERF registers, on some platforms) and using a time-stamp counter (e.g., TSC). In block 322, the P-state management task determines a new P-state value based on the CPU load data value computed in block 320. To do this, the P-state management task computes a target CPU frequency value, maps the target CPU frequency value to a corresponding value specified in the performance management policy (e.g., the CPU frequency policy 138), and evaluates the new P-state value according to the performance management policy. In doing so, the P-state management task compares the new P-state value to the P-state value read in block 316. In block 324, the P-state management task determines whether the new P-state value is different than the P-state value for the previous time interval. If the new P-state value is different than the previous P-state value, the P-state management task updates the P-state of the CPU in block 326. To do this, the P-state management task writes the new P-state value to the appropriate register of the CPU (e.g., the PERF_CTL register, in some embodiments).

Figure 4:
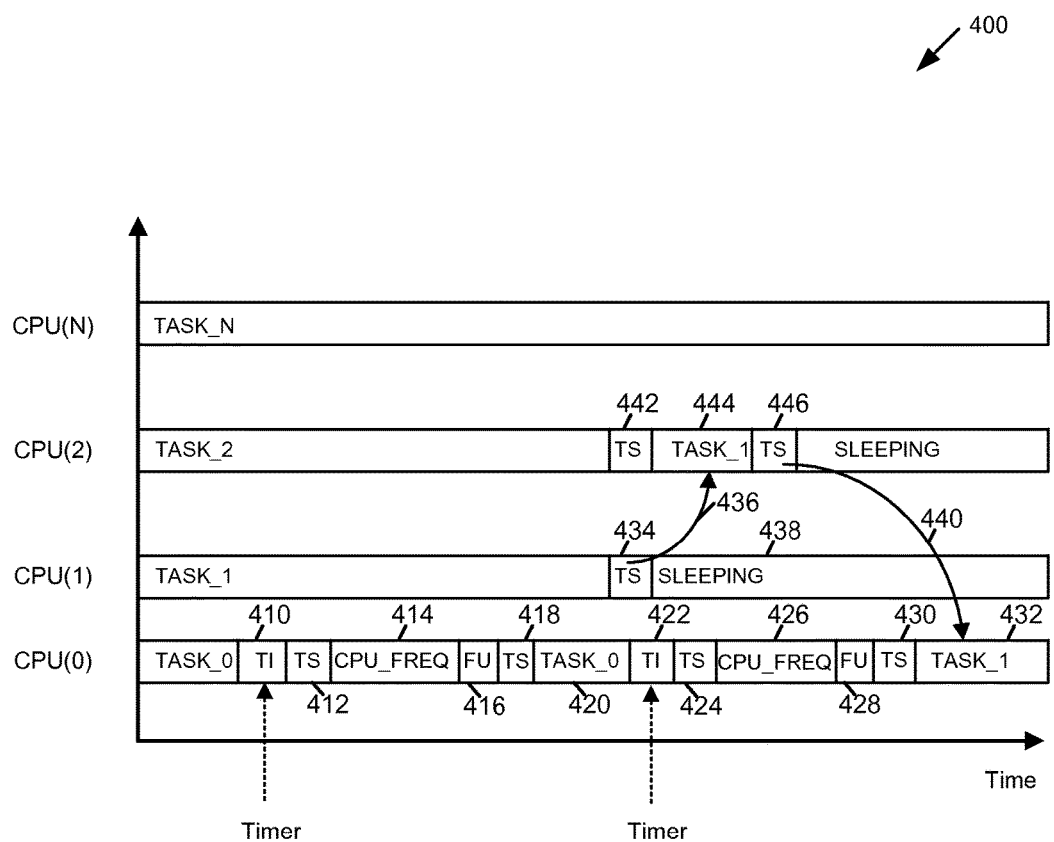
FIG. 4 is a simplified timing diagram illustrating the operation of the multiple-CPU P-state management technology disclosed herein.

Referring now to FIG. 4, a simplified illustration of the operation of the P-state manager 136 is shown. Initially, the task scheduler module 148 schedules a task on each of the CPUs (TASK_0 is scheduled on CPU(0), TASK_1 is scheduled on CPU(1), TASK_2 is scheduled on CPU(2), and TASK_N is scheduled on CPU(N)). At 410, the deferrable timer 142 expires, causing a timer interrupt. At 412, the task scheduler module 148 schedules the P-state manager 136 periodic task (CPU_FREQ) for execution by CPU(0). At 414, CPU_FREQ reads the performance monitoring data of all of the CPUs 0, 1, 2, N, evaluates the P-states of each of the CPUs 0, 1, 2, N, and initiates a frequency update (416) to update the CPU frequencies that need to be updated, in accordance with the CPU frequency policy 138. To do this, the CPU_FREQ sends a request to the affected CPU's hardware to update the CPU frequency (e.g., by writing a new value to the PERF_CTL register of the affected CPU, in some architectures).

In the example of FIG. 4, the CPU_FREQ task 414 updates the frequencies of both CPU(0) and CPU(1) at 416, but does not update the frequencies of CPU(2) and CPU(3). After the frequency update on CPU(0), TASK_0 is resumed on CPU(0), at 420. The task scheduler module 148 operates independently of the CPU frequency updates. In other words, a frequency update by the CPU_FREQ task 414 does not automatically trigger a rescheduling of tasks on the affected CPUs. In the example of FIG. 4, the task scheduler module 148 decides to move the execution of TASK_1 from CPU(1) to CPU(2) at 434, 442, 444, which leads to CPU(1) entering a sleep state at 438. The task scheduler module 148 may interrupt tasks to schedule other tasks based on one or more scheduling criteria (e.g., task priority, task tick time elapsed, etc.). CPU task scheduling performed by the task scheduler module 148 is dynamic and any CPU may be off or on when its load is evaluated. At 422, expiration of the deferrable timer 142 interrupts TASK_0 for another performance monitoring task. At 424, the task scheduler module 148 schedules the CPU_FREQ task, and CPU_FREQ is executed by CPU(0) at 426, resulting in another frequency update, at 428. In the example of FIG. 4, the frequency update 428 only updates the frequency of CPU(2), and does not change the frequency of CPU(0), CPU(1), or CPU(3). The frequency update 428 results in another core task switch, 440. The task scheduler module 148 moves execution of TASK_1 from CPU(2) to CPU(0) (e.g., based on some task scheduling criterion, but not necessarily in response to the frequency update). CPU(1) begins executing TASK_1 at 432, and CPU(2) enters a sleep state following the task switch. Thus, in the illustration of FIG. 4, a single periodic task, CPU_FREQ, running on CPU(0), manages the frequency updates for all of the CPUs 0, 1, 2, N, with one deferrable timer 142. As a result, there is only one interrupt and two context switches on timer expiration. This is in contrast to prior solutions, which require the number of periodic tasks (and thus, the number of deferrable timers) to equal the number of CPUs (e.g., N CPU_FREQ tasks and N deferrable timers), thereby resulting in N interrupts and 2N context switches. Accordingly, aspects of the presently disclosed solution can decrease the number of interrupts, context switches, and rescheduling of tasks needed for performance management. Further, in per-module organized SoC implementations, for example, the P-state manager 136 running on CPU(0) can allow the other CPUs 1, 2, N to be power gated while the P-state manager 136 computes the respective CPU load (e.g., by using the CPU's performance counters), so that the CPU load computations are computed without waking up the CPUs. The power gated CPU does not update its performance counter, so the main CPU can read the unchanged data between two samplings, for a CPU that is power gated during that time period.

EXAMPLES

Illustrative examples of the technologies disclosed herein are provided below. An embodiment of the technologies may include any one or more, and any combination of, the examples described below.

Example 1 includes a computing device with P-state management across multiple central processing units (CPUs). The computing device includes a plurality of CPUs, each CPU to generate CPU performance monitoring data during a time interval in which the CPU operates; and a P-state manager to run on one of the CPUs operating as a main CPU, the P-state manager to, for each of the CPUs: access the performance monitoring data of the CPU; and based on the performance monitoring data for the CPU, compute a P-state target value for the CPU.

Example 2 includes the subject matter of Example 1, wherein the performance monitoring data of each of the CPUs comprises a current P-state data value and CPU frequency data values indicative of a CPU load during the time interval, and wherein the P-state manager is to, for each of the CPUs: read the current P-state data value; compute the CPU load based on the CPU frequency data values; and compute the P-state target value based on the CPU load.

Example 3 includes the subject matter of Example 1 or Example 2, wherein the P-state manager is to, for each of the CPUs, compare the P-state target value to a CPU frequency policy.

Example 4 includes the subject matter of Example 3, wherein the P-state manager is to, for each of the CPUs, determine a new P-state data value based on the comparison of the P-state target value to the CPU frequency policy.

Example 5 includes the subject matter of Example 4, wherein the P-state manager is to, for each of the CPUs, compare the new P-state data value to the current P-state data value, and determine whether to update P-state data of the CPU based on the comparison of the new P-state data value to the current P-state data value.

Example 6 includes the subject matter of Example 4 or Example 5, wherein the P-state manager is to apply the new P-state data value to the CPU.

Example 7 includes the subject matter of Example 4 or Example 5, wherein the P-state manager is to apply the new P-state data value to the CPU by updating the CPU frequency of the CPU.

Example 8 includes the subject matter of any of Examples 1, 2, 4, or 5, wherein the P-state manager is to access, from the main CPU, the performance monitoring data of all of the CPUs, using a zero-delay access mechanism.

Example 9 includes the subject matter of Example 8, wherein the zero-delay access mechanism is to access the data of each of the CPUs without using any interrupts.

Example 10 includes the subject matter of Example 9, wherein the zero-delay access mechanism is to access the data of each of the CPUs without using any inter-processor communication mechanisms.

Example 11 includes the subject matter of any of Examples 1, 2, 4, or 5, wherein the P-state manager is to map the performance monitoring data of each of the CPUs to address space of the main CPU.

Example 12 includes the subject matter of any of Examples 1, 2, 4, or 5, wherein the P-state manager is to execute as a single periodic task on the main CPU.

Example 13 includes the subject matter of any of Examples 1, 2, 4, or 5, wherein the P-state manager is to execute in response to expiration of a deferrable timer.

Example 14 includes the subject matter of Example 1, wherein the P-state manager is to selectively update CPU frequency data of the CPUs based on a CPU frequency policy.

Example 15 includes the subject matter of Example 1, wherein the P-state manager is to update CPU frequency data of a subset of the CPUs based on the P-state target values computed for the CPUs.

Example 16 includes a method for managing the P-state of a computing device across multiple central processing units (CPUs) of the computing device. The method includes generating CPU performance monitoring data during a time interval in which the CPU operates; and running, on one of the CPUs designated as a main CPU, a periodic task to, for each of the CPUs: access the performance monitoring data of the CPU; and based on the performance monitoring data for the CPU, compute a P-state target value for the CPU.

Example 17 includes the subject matter of Example 16, wherein the performance monitoring data of each of the CPUs includes a current P-state data value and a CPU frequency data value indicative of a CPU load during the time interval, and the method includes, for each of the CPUs: computing the CPU load based on the CPU frequency data value; and computing the P-state target value based on the CPU load.

Example 18 includes the subject matter of Example 16, and includes, for each of the CPUs, comparing the P-state target value to a CPU frequency policy.

Example 19 includes the subject matter of Example 18, and includes, for each of the CPUs, determining a new P-state data value based on the comparison of the P-state target value to the CPU frequency policy.

Example 20 includes the subject matter of Example 19, and includes, for each of the CPUs, comparing the new P-state data value to the current P-state data value, and determining whether to update P-state data of the CPU based on the comparison of the new P-state data value to the current P-state data value.

Example 21 includes the subject matter of Example 19, and includes, for each of the CPUs, applying the new P-state data value to the CPU.

Example 22 includes the subject matter of Example 19, and includes, for each of the CPUs, updating the CPU frequency of the CPU in accordance with the new P-state data value.

Example 23 includes the subject matter of Example 16, and includes accessing, from the main CPU, the performance monitoring data of all of the CPUs, using a zero-delay access mechanism.

Example 24 includes the subject matter of Example 16, and includes accessing the data of each of the CPUs without using any interrupts.

Example 25 includes the subject matter of Example 16, and includes accessing the data of each of the CPUs without using any inter-processor communication mechanisms.

Example 26 includes the subject matter of Example 16, and includes mapping the performance monitoring data of each of the CPUs to address space of the main CPU.

Example 27 includes the subject matter of Example 16, and includes executing a single periodic task on the main CPU to compute the P-state target values for all of the CPUs.

Example 28 includes the subject matter of Example 27, and includes executing the single periodic task in response to expiration of a deferrable timer.

Example 29 includes the subject matter of Example 16, and includes selectively updating CPU frequency data of the CPUs based on a CPU frequency policy.

Example 30 includes the subject matter of Example 16, and includes updating CPU frequency data of a subset of the CPUs based on the P-state target values computed for the CPUs.

Example 31 includes one or more machine readable storage media including a plurality of instructions stored thereon that in response to being executed result in a computing device performing the method of any of Examples 16-30.

Example 32 includes a computing device including means for executing the method of any of Examples 16-30.

The invention claimed is:

1. A computing device with P-state management across multiple central processing units (CPUs), the computing device comprising:
   a plurality of CPUs, wherein each CPU is to generate performance monitoring data indicative of a performance parameter of the corresponding CPU while the corresponding CPU operates and to write the performance monitoring data generated by the corresponding CPU to a location in a shadow memory assigned to the corresponding CPU; and
   a P-state manager to run on one of the CPUs operating as a main CPU in response to expiration of a deferrable timer, the P-state manager to, for each of the CPUs:
   retrieve the corresponding performance monitoring data generated by the each CPU from the shadow memory; and
   based on the retrieved performance monitoring data for the each CPU, compute a P-state target value for the corresponding CPU.

2. The computing device of claim 1, wherein the generated performance monitoring data of each of the CPUs comprises a current P-state data value and CPU frequency data values indicative of a CPU load while the corresponding CPU operates, and wherein the P-state manager is to, for each of the CPUs:
   read the current P-state data value;
   compute the CPU load based on the CPU frequency data values; and
   compute the P-state target value based on the CPU load.

3. The computing device of claim 1, wherein the P-state manager is to, for each of the CPUs, compare the P-state target value to a CPU frequency policy.

4. The computing device of claim 3, wherein the P-state manager is to, for each of the CPUs, determine a new P-state data value based on the comparison of the P-state target value to the CPU frequency policy.

5. The computing device of claim 4, wherein the P-state manager is to, for each of the CPUs, compare the new P-state data value to the current P-state data value, and determine whether to update P-state data of the CPU based on the comparison of the new P-state data value to the current P-state data value.

6. The computing device of claim 4, wherein the P-state manager is to apply the new P-state data value to the CPU.

7. The computing device of claim 4, wherein the P-state manager is to apply the new P-state data value to the CPU by updating the CPU frequency of the CPU.

8. The computing device of claim 4, wherein the P-state manager is to retrieve, while operating as the main CPU, the generated performance monitoring data of all of the CPUs from the shadow memory, using a zero-delay access mechanism.

9. The computing device of claim 8, wherein the zero-delay access mechanism is to access the data of each of the CPUs without using any interrupts.

10. The computing device of claim 9, wherein the zero-delay access mechanism is to access the data of each of the CPUs without using any inter-processor communication mechanisms.

11. The computing device of claim 4, wherein the P-state manager is to map the generated performance monitoring data of each of the CPUs from the shadow memory to address space of the main CPU.

12. The computing device of claim 4, wherein the P-state manager is to execute as a single periodic task on the main CPU.

13. The computing device of claim 1, wherein the P-state manager is to selectively update CPU frequency data of the CPUs based on a CPU frequency policy.

14. The computing device of claim 1, wherein the P-state manager is to update CPU frequency data of a subset of the CPUs based on the P-state target values computed for the CPUs.

15. The computing device of claim 1, wherein to run on the main CPU in response to expiration of the deferrable timer comprises to run on the main CPU in response to expiration of the deferrable timer when the main CPU is in an active state.

16. A method for managing the P-state of a computing device across multiple central processing units (CPUs) of the computing device, the method comprising:
generating, by each CPU, performance monitoring data indicative of a performance parameter of the corresponding CPU while the corresponding CPU operates;
writing, by each CPU, the performance monitoring data generated by the corresponding CPU to a location in a shadow memory assigned to the corresponding CPU; and
running, on one of the CPUs designated as a main CPU in response to expiration of a deferrable timer, a periodic task to, for each of the CPUs:
retrieve the performance monitoring data generated by the each CPU from the shadow memory; and
based on the retrieved performance monitoring data for the each CPU, computing a P-state target value for the corresponding CPU.

17. The method of claim 16, comprising, using a zero-delay access mechanism, accessing, from the main CPU, the generated performance monitoring data of all of the CPUs.

18. The method of claim 16, wherein running, on the main CPU in response to expiration of the deferrable timer, the periodic task comprises running the periodic task on the main CPU in response to expiration of the deferrable timer when the main CPU is in an active state.

19. One or more non-transitory, machine readable storage media comprising a plurality of instructions stored thereon that in response to being executed result in a computing device managing the P-state of a computing device across multiple central processing units (CPUs) of the computing device, by:
generating, by each CPU, performance monitoring data indicative of a performance parameter of the corresponding CPU while the corresponding CPU operates;
writing, by each CPU, the performance monitoring data generated by the corresponding CPU to a location in a shadow memory assigned to the corresponding CPU; and
running, on one of the CPUs designated as a main CPU in response to expiration of a deferrable timer, a periodic task to, for each of the CPUs:
retrieve the performance monitoring data generated by the each CPU from the shadow memory; and
based on the retrieved performance monitoring data for the each CPU, computing a P-state target value for the corresponding CPU.

20. The one or more non-transitory, machine readable storage media of claim 19, wherein the generated performance monitoring data of each of the CPUs comprises a current P-state data value and a CPU frequency data value indicative of a CPU load while the corresponding CPU operates, and the method comprises, for each of the CPUs:
computing the CPU load based on the CPU frequency data value; and
computing the P-state target value based on the CPU load.

21. The one or more non-transitory, machine readable storage media of claim 19, wherein the instructions result in the computing device, for each of the CPUs: comparing the P-state target value to a CPU frequency policy, and determining a new P-state data value based on the comparison of the P-state target value to the CPU frequency policy.

22. The one or more non-transitory, machine readable storage media of claim 21, wherein the instructions result in the computing device, for each of the CPUs: comparing the new P-state data value to the current P-state data value, determining whether to update P-state data of the CPU based on the comparison of the new P-state data value to the current P-state data value, applying the new P-state data value to the CPU, and updating the CPU frequency of the CPU in accordance with the new P-state data value.

23. The one or more non-transitory, machine readable storage media of claim 19, wherein the instructions result in the computing device, using a zero-delay access mechanism, accessing, from the main CPU, the generated performance monitoring data of all of the CPUs.

24. The one or more non-transitory, machine readable storage media of claim 19, wherein the instructions result in the computing device updating CPU frequency data of a subset of the CPUs based on the P-state target values computed for all of the CPUs.

25. The one or more non-transitory, machine readable storage media of claim 19, wherein running the single periodic task on the main CPU comprises running the periodic task in response to expiration of the deferrable timer when the main CPU is in an active state.

\* \* \* \* \*

UNITED STATES PATENT AND TRADEMARK OFFICE
CERTIFICATE OF CORRECTION

PATENT NO. : 10,275,007 B2
APPLICATION NO. : 14/498500
DATED : April 30, 2019
INVENTOR(S) : Thomas Buhot et al.

Page 1 of 1

It is certified that error appears in the above-identified patent and that said Letters Patent is hereby corrected as shown below:

On the Title Page

Item (72), Spelling of second Inventor's address should be corrected from --Tournfeuille-- to --Tournefeuille--

Signed and Sealed this
Thirtieth Day of July, 2019

Andrei Iancu
*Director of the United States Patent and Trademark Office*